UNITED STATES PATENT OFFICE.

CHARLES WOODLAND CHITTY, OF DOVER, AND WILLIAM JAGO, OF LONDON, ENGLAND.

MANUFACTURE OF FLOUR AND BREAD.

1,063,414. Specification of Letters Patent. Patented June 3, 1913.

No Drawing. Application filed January 27, 1912. Serial No. 673,734.

*To all whom it may concern:*

Be it known that we, CHARLES WOODLAND CHITTY and WILLIAM JAGO, subjects of the King of England, respectively residing at Dover, Kent, England, and London, England, have invented certain new and useful Improvements in the Manufacture of Flour and Bread, of which the following is a specification.

This invention relates to improvements in the manufacture of flour and bread.

It is desirable in the manufacture of bread that the dough shall possess "strength" and shall produce a bold, well-risen loaf. That is to say, it is desirable that the gluten and the dough containing it should have resiliency and stability or the power of standing up as a well-formed loaf. This property is partly governed by the amount and characteristics of the mineral salts contained in the flour or dough.

Previously it has been proposed in the manufacture of bread and the like to mix with the dough peroxid of hydrogen and we have now found that the presence in dough of a small quantity of certain substances such as persulfuric acid and its salts, which belong to the class of those containing loosely combined oxygen, materially improves and increases the property known to bakers as "strength." For example, such addition may be made directly to the dough itself, or indirectly by a previous treatment therewith of the wheat or of the flour at any suitable stage of its manufacture or handling.

As bread is an article of food we use only such salts of this class as are harmless substances and more particularly harmless persalts, which on their decomposition yield to mixture of products which has an acid reaction. Among the substances containing loosely combined oxygen, we find the persulfates very suitable for our purpose, and have employed potassium persulfate with great success. This salt, otherwise known as potassium per- di- sulfate $K_2S_2O_8$ is generally prepared by electrolysis of hydrogen potassium sulfate. On being heated it splits up into normal sulfate with the liberation of sulfur trioxid and oxygen $$K_2S_2O_8 = K_2SO_4 + SO_3 + O.$$

The trace of sulfur trioxid produced will immediately be converted into sulfuric acid by the water present and that in turn will be transformed into neutral sulfates by the action of the carbonates, etc., naturally present in the dough. But we do not confine ourselves to persulfuric acid and its salts. Other salts of acids containing loosely combined oxygen may be employed.

In carrying our invention into practice we find that a remarkably small quantity of the added substance is sufficient to accomplish the desired improvement. For example, a quantity of from half an ounce to one ounce of potassium persulfate to one sack (280 lbs.) of flour give exceedingly good results, but we do not necessarily confine ourselves to those proportions.

Various advantages accrue from this invention. The dough is not sticky but is coherent so that it "works" well, that is to say, the handling properties of the dough are improved. The yield of the flour is better; the number of loaves per sack of flour is increased. Further, the treatment of the flour or dough as described imparts to the loaves the desirable qualities of good size, shape and texture.

We find our invention to be of value in the treatment of flour from most kinds of wheat, for example wheats of which the following may be regarded as types, English, Plates, Russian, Manitoban. We found however that flours from certain kinds of wheat which have a ricey character of which Indians are an example, show little or no improvement by our process. But where such wheats are used in admixture with other wheats we find an improvement results, the extent of which is dependent on the proportion of other wheats present. In wheats of this type we find that the use of a softening agent such as some proportion of malt of a diastatic character (in addition to the agents mentioned) is an advantage.

What we claim as our invention and desire to secure by Letters Patent is:—

1. The hereindescribed combination of matter for making bread comprising flour mixed with a small quantity of a harmless persalt which on decomposition yields products having an acid reaction.

2. The hereindescribed combination of matter for making bread comprising flour mixed with a small quantity of potassium persulfate.

3. The hereindescribed combination of matter for making bread comprising dough mixed with a small quantity of a harmless persalt, which on decomposition yields products having an acid reaction.

4. The hereindescribed combination of matter for making bread comprising dough mixed with a small quantity of potassium persulfate.

5. The hereindescribed combination of matter for making bread comprising flour mixed with a small quantity of a harmless persalt which on decomposition yields products having an acid reaction and a malt preparation of high diastatic character.

6. The hereindescribed combination of matter for making bread comprising flour mixed with a small quantity of potassium persulfate and a malt preparation of high diastatic character.

7. The hereindescribed combination of matter for making bread comprising dough mixed with a small quantity of a harmless persalt which on decomposition yields products having an acid reaction and a malt preparation of high diastatic character.

8. The hereindescribed combination of matter for making bread comprising dough mixed with a small quantity of potassium persulfate and a malt preparation of high diastatic character.

In testimony whereof we have signed our names to this specification in the presence of two subscribing witnesses.

CHARLES WOODLAND CHITTY.
WILLIAM JAGO,

Witnesses:
ERNEST WILLIAM MOSS,
EDWARD WALTER FRANKLIN.